(12) United States Patent
Teraoka

(10) Patent No.: US 11,407,344 B2
(45) Date of Patent: Aug. 9, 2022

(54) WORK VEHICLE HAVING DRIVER'S SEAT

(71) Applicant: KUBOTA CORPORATION, Osaka (JP)

(72) Inventor: Tasuku Teraoka, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 744 days.

(21) Appl. No.: 16/406,660

(22) Filed: May 8, 2019

(65) Prior Publication Data

US 2020/0353850 A1    Nov. 12, 2020

(51) Int. Cl.
*B60N 2/50*    (2006.01)
*B60N 2/68*    (2006.01)
*B60N 2/54*    (2006.01)

(52) U.S. Cl.
CPC ............. *B60N 2/502* (2013.01); *B60N 2/544* (2013.01); *B60N 2/68* (2013.01); *B60N 2205/20* (2013.01)

(58) Field of Classification Search
CPC .......... B60N 2/502; B60N 2/544; B60N 2/68; B60N 2205/20
See application file for complete search history.

(56) References Cited

U.S. PATENT DOCUMENTS 6,669,293 B2    12/2003    Moore
10,023,083 B1    7/2018    Tada

FOREIGN PATENT DOCUMENTS

| CN | 2709238 Y | * | 5/2007 | |
| CN | 109532589 A | * | 3/2019 | ............. B60N 2/502 |
| DE | 4231095 C2 | * | 3/1997 | ............... B60N 2/06 |
| JP | 09108064 A | * | 4/1997 | ............... A47C 7/14 |

* cited by examiner

*Primary Examiner* — Anthony D Barfield
(74) *Attorney, Agent, or Firm* — Greenblum & Bernstein, P.L.C.

(57) ABSTRACT

A work vehicle includes a driver's seat attached to a seat base, a support shaft attached to the seat base and extending in a vehicle body transverse direction, the support shaft pivotably connecting the seat base with the vehicle body frame, and an isolator mounted on the support shaft to absorb only vibration in a vehicle body front/rear direction.

4 Claims, 6 Drawing Sheets

WORK VEHICLE HAVING DRIVER'S SEAT

TECHNICAL FIELD

This invention relates to a work vehicle having a driver's seat capable of absorbing shock and/or vibration.

BACKGROUND ART

U.S. Pat. No. 6,669,293 discloses an anti-vibration seat device to be mounted on a vehicle body frame of a work vehicle such as a lawnmower. This anti-vibration seat device consists of a seat frame as a seat mounting member, a bolt assembly, a bracket, and an isolator. The bolt assembly is fixed to the seat frame and the bracket is fixed to the vehicle body frame. The bolt assembly is inserted into a pivot slot formed in the bracket. With this, the seat frame, together with the seat, can be pivoted about the bolt assembly between a DOWN posture and an UP posture. A rubber-made isolator is fixed to the vehicle body frame in such a manner as to come into contact with lower faces of a front end and a rear end of the seat frame under the DOWN posture. When a passenger is seated, the seat frame is supported to the vehicle body frame via the isolator. With this, transmission of vertical vibration of the vehicle body frame to the seat frame, namely, to the seat, is lessened.

U.S. Pat. No. 10,023,083 discloses a seat device for a work vehicle such as a tractor, the seat device comprising a seat base supported to a vehicle body frame, a seat attached to the seat base, and a suspension unit. The seat base is pivotable about a support shaft which extends in the vehicle body transverse direction. The suspension unit is disposed between the seat base and the vehicle body frame and suppresses vibration of the seat base in the vehicle body vertical direction in association with the pivotal movement about the support shaft.

SUMMARY OF THE INVENTION

With the seat devices disclosed in U.S. Pat. Nos. 6,669,293 and 10,023,083, vertical vibrations (vehicle body perpendicular direction) are absorbed by the isolator or the suspension unit, so comfortable riding feel can be expected in a flat land traveling. However, with these seat devices, vibration in the direction (horizontal direction) perpendicular to the vehicle body perpendicular direction is not sufficiently absorbed as compared with vibration in the vehicle body vertical direction.

Thus, an object of the present invention is to provide a work vehicle having a seat capable of appropriately suppressing not only vibration in the vehicle body perpendicular direction also vibration in the direction perpendicular to the vehicle body perpendicular direction.

A work vehicle according to the present invention comprises: a vehicle body frame supported on a ground surface via wheels; a seat base; a driver's seat attached to the seat base; a support shaft attached to the seat base and extending in a vehicle body transverse direction, the support shaft pivotably connecting the seat base with the vehicle body frame; and an isolator mounted on the support shaft to absorb only vibration in a vehicle body front/rear direction.

Vibration which occurs in the direction perpendicular to the vehicle body perpendicular direction during vehicle traveling can be classified into vibration in the vehicle body front/rear direction and vibration in the vehicle body transverse direction. The present inventors discovered that causing an isolator to absorb vibration in the vehicle body front/rear direction improves riding comfort at time of work traveling in a work land, but causing the isolator to absorb vibration in the vehicle body transverse direction does not improve riding comfort, during traveling on a sloped land in particular, and it moreover, deteriorates the riding comfort. According to finding made by the present inventors, the reason is that in the case of a seat configured to cause an isolator to absorb vibration in the vehicle body transverse direction, the seat will be displaced in the case of sloped land traveling. Further, especially in the case of a work vehicle such as a zero-turn mower configured to effect sharp turn with left and right rear wheels being driven independently, such seat arrangement contributes to improvement of its riding comfort.

In case the isolator is mounted on a support shaft which serves as a connection point between the seat base and the vehicle body frame, it is advantageous to employ an isolator arrangement in which vibration in the vehicle body front/rear direction between the seat base and the vehicle body frame is transmitted via the isolator and the support shaft whereas vibration in the vehicle body transverse direction between the seat base and the vehicle body frame is transmitted via the support shaft only. Advantageously, if the support shaft is constituted of a bolt unit that can fasten the vehicle body frame and the seat base together in the vehicle body transverse direction, the isolator can be provided as a cylindrical body whose inner circumferential face contacts the support shaft and whose outer circumferential face contacts the seat base.

DETAILED DESCRIPTION

Next, a riding type mower as one embodiment of a work vehicle relating to the present invention will be explained with reference to the accompanying drawings. Incidentally, in this detailed description, unless indicated otherwise, a word "front" means the front (forward) side with respect to a vehicle body front/rear direction (traveling direction). A word "rear" means the rear (rearward or reverse) side with respect to the vehicle body front/rear direction (traveling direction). Further, a language "left/right direction" or "lateral direction" means a vehicle body transverse direction (vehicle body width direction) perpendicular to the vehicle body front/rear direction. Also, a word "upper" and a word "lower" respectively refer to positional relationship in the perpendicular direction (vertical direction) of the vehicle body, indicating relationship in terms of ground clearance height.

Figure 1:
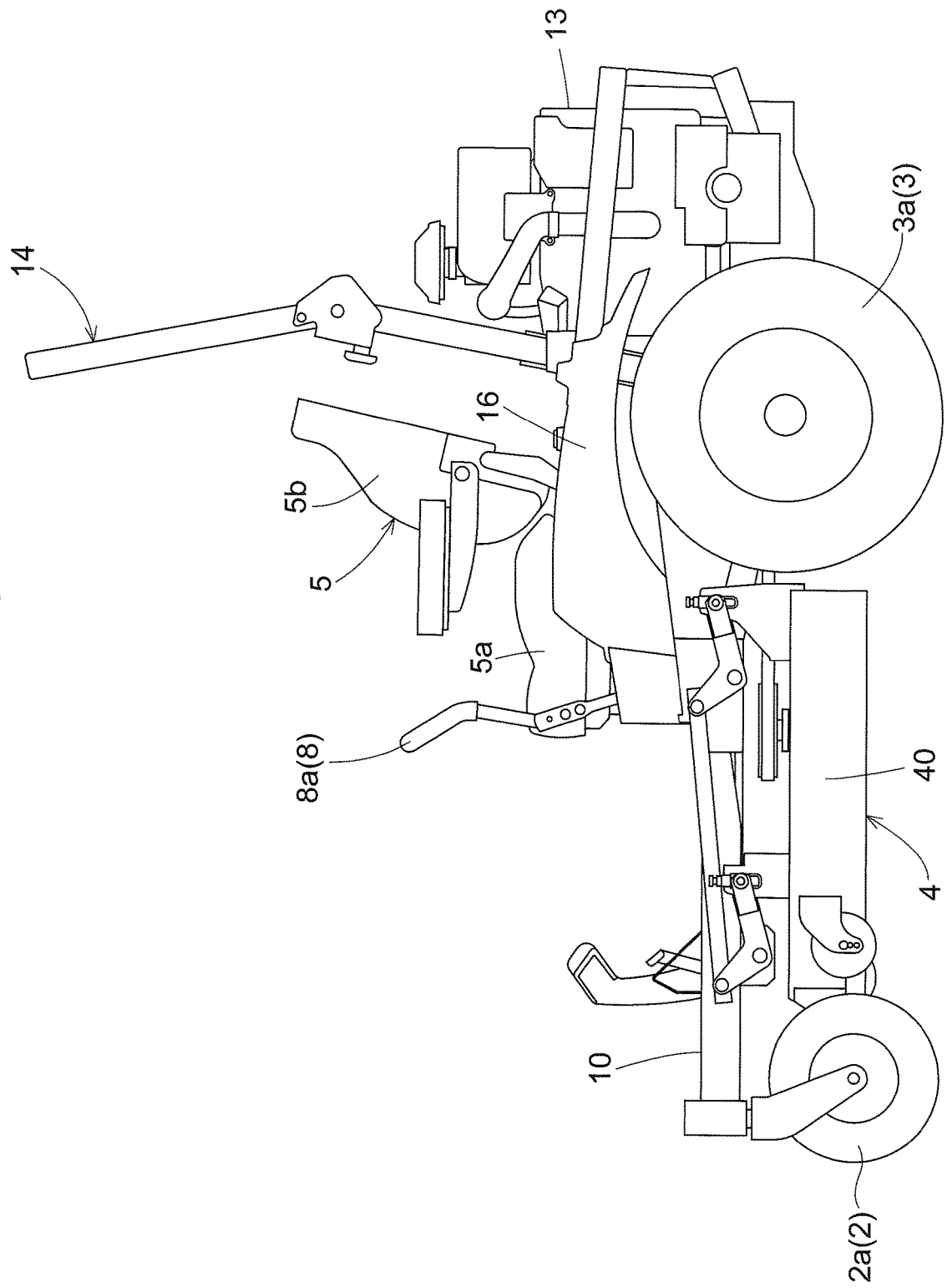
FIG. 1 is a side view of a mower.
Figure 2:
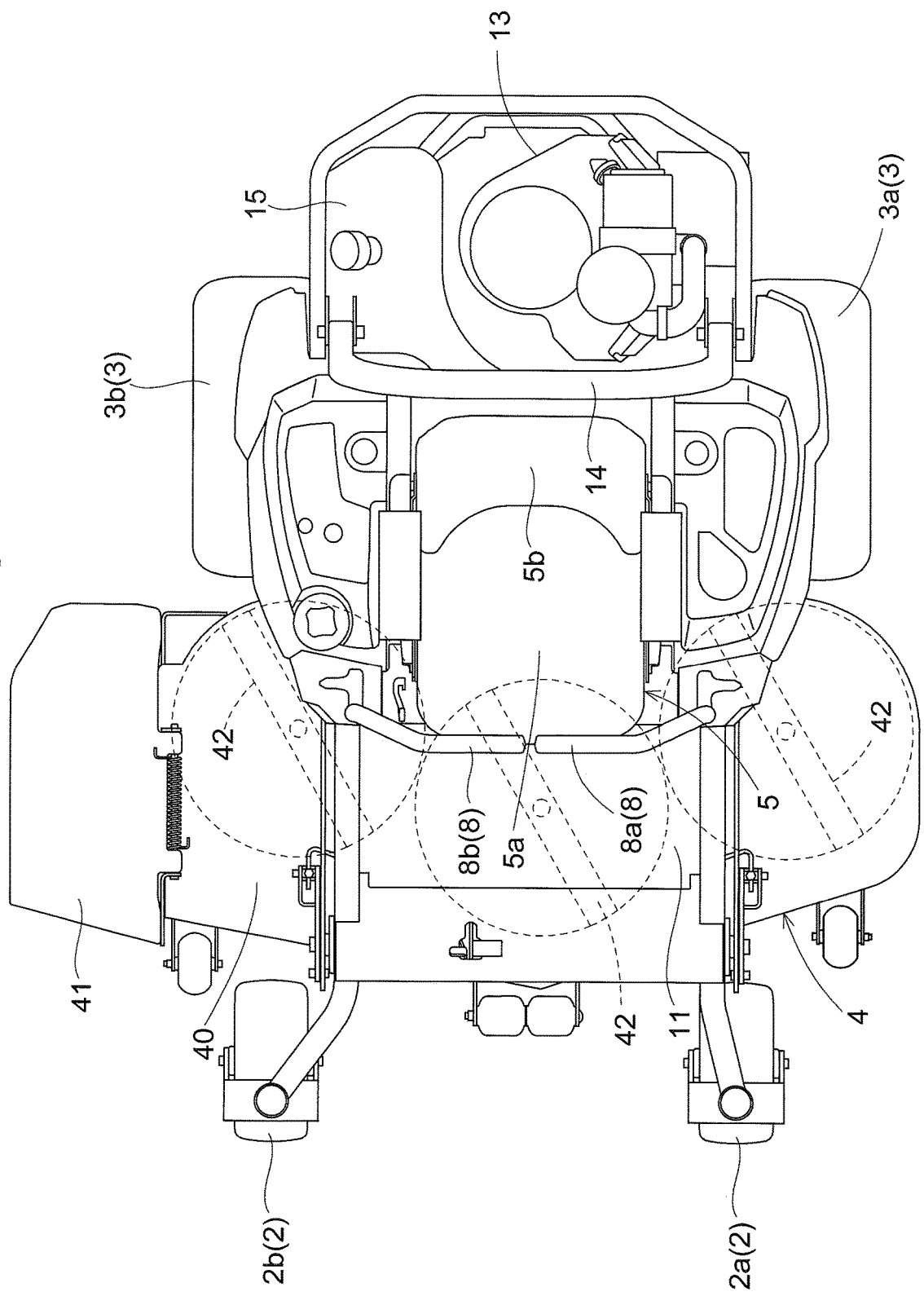
FIG. 2 is a plan view of the mower.

As shown in FIG. 1 and FIG. 2, this mower includes a vehicle body frame 10 which is supported on a ground surface via a front wheel unit 2 as a caster unit and a rear wheel unit 3 as driving wheels. This mower is a so-called zero-turn mower with a left rear wheel 3a and a right rear wheel 3b together constituting the rear wheel unit 3 being independently speed-controlled in the forward and reverse directions. The front wheel unit 2 includes a pair of left and right front wheels 2a, 2b. The vehicle body frame 10 is formed of a pair of left and right longitudinal frames extending in the vehicle body front/rear direction and cross beams extending in the vehicle body transverse direction to interconnect the longitudinal frames and formed of angular pipes or plate members. Between the front wheel unit 2 and the rear wheel unit 3, a mower unit 4 is suspended from the vehicle body frame 10 to be liftable up/down.

At a center portion of the vehicle body frame 10 in the vehicle body front/rear direction, a driver's seat 5 is provided. The driver's seat 5 consists of a seat cushion 5a and a seat back 5b. The seat cushion 5a is attached to a seat base 50 supported to the vehicle body frame 10. On the upper face of the front portion of the vehicle body frame 10, there is laid a floor plate 11 for use as a "footrest" for the driver. In the front area of the floor plate 11, foot operational tools are disposed. At the rear portion of the vehicle body frame 10 rearwardly of the driver's seat 5, there are disposed an engine 13 as an internal combustion engine, a fuel tank 15, and so on.

A maneuvering unit 8 as one user operable device consists of a left maneuvering lever 8a disposed on the left side of the driver's seat 5 and a right maneuvering lever 8b disposed on the right side of the driver's seat 5. The left maneuvering lever 8a is used for adjusting a rotational speed of the left rear wheel 3a. The right maneuvering lever 8b is used for adjusting a rotational speed of the right rear wheel 3b. And, the left maneuvering lever 8a and the right maneuvering lever 8b are respectively operable over and across a forward traveling speed changing range, a neutral and a reverse traveling speed changing range.

On the left and right opposed sides of the driver's seat 5, there are provided rear wheel fenders 16. In the upper face of each fender 16, there are formed recesses for accommodating article(s), and a platform for appropriately disposing thereon the user operable devices such as the various operational levers, operational buttons, etc. Rearwardly of the driver's seat 5, an arch-shaped ROPS 14 is mounted vertically.

The mower unit 4 includes a side-discharge type mower deck 40 and a discharger cover 41 disposed on a grass clipping discharging side of the mower deck 40. In the inner space of the mower deck 40, there are provided three blades 42 that are disposed side by side in the vehicle body transverse direction. The blades 42 are rotated by PTO power from the engine 13.

Power from the engine 13 is transmitted via an unillustrated traveling transmission including a pair of left and right HST's (hydrostatic transmissions) to the left rear wheel 3a and the right rear wheel 3b independently. Speed changing ratios including forward traveling, reverse traveling and the neutral are adjusted based on pivotal operations of the left maneuvering lever 8a and the right maneuvering lever 8b. More particularly, in response to user operations on the left maneuvering lever 8a and the right maneuvering lever 8b, a stopped state, a straight traveling state, a gentle turning state, a pivot turning stage and a spin turning state can be realized respectively. The stopped state is realized by stopping the left rear wheel 3a and the right rear wheel 3b. The straight traveling state is realized by driving the left rear wheel 3a and the right rear wheel 3b at an equal speed forwardly or reversely. The gentle turning state is realized by driving the left rear wheel 3a and the right rear wheel 3b at different speeds forwardly or reversely. The pivot turning state is realized by stopping one of the left rear wheel 3a and the right rear wheel 3b and driving the other forwardly or reversely. The spin turning state is realized by driving one of the left rear wheel 3a and the right rear wheel 3b forwardly and driving the other thereof reversely.

Figure 3:
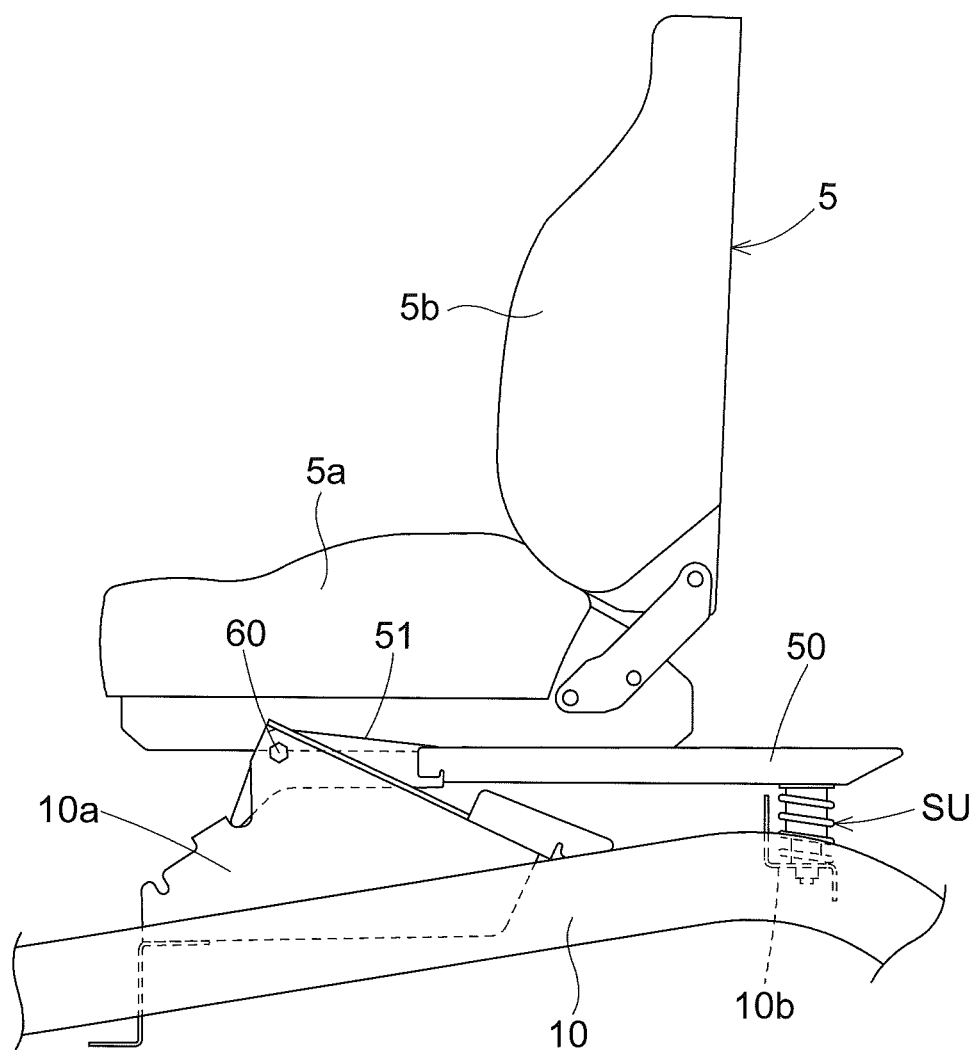
FIG. 3 is a schematic view schematically showing an attachment arrangement between a vehicle body frame and a seat base.
Figure 4:
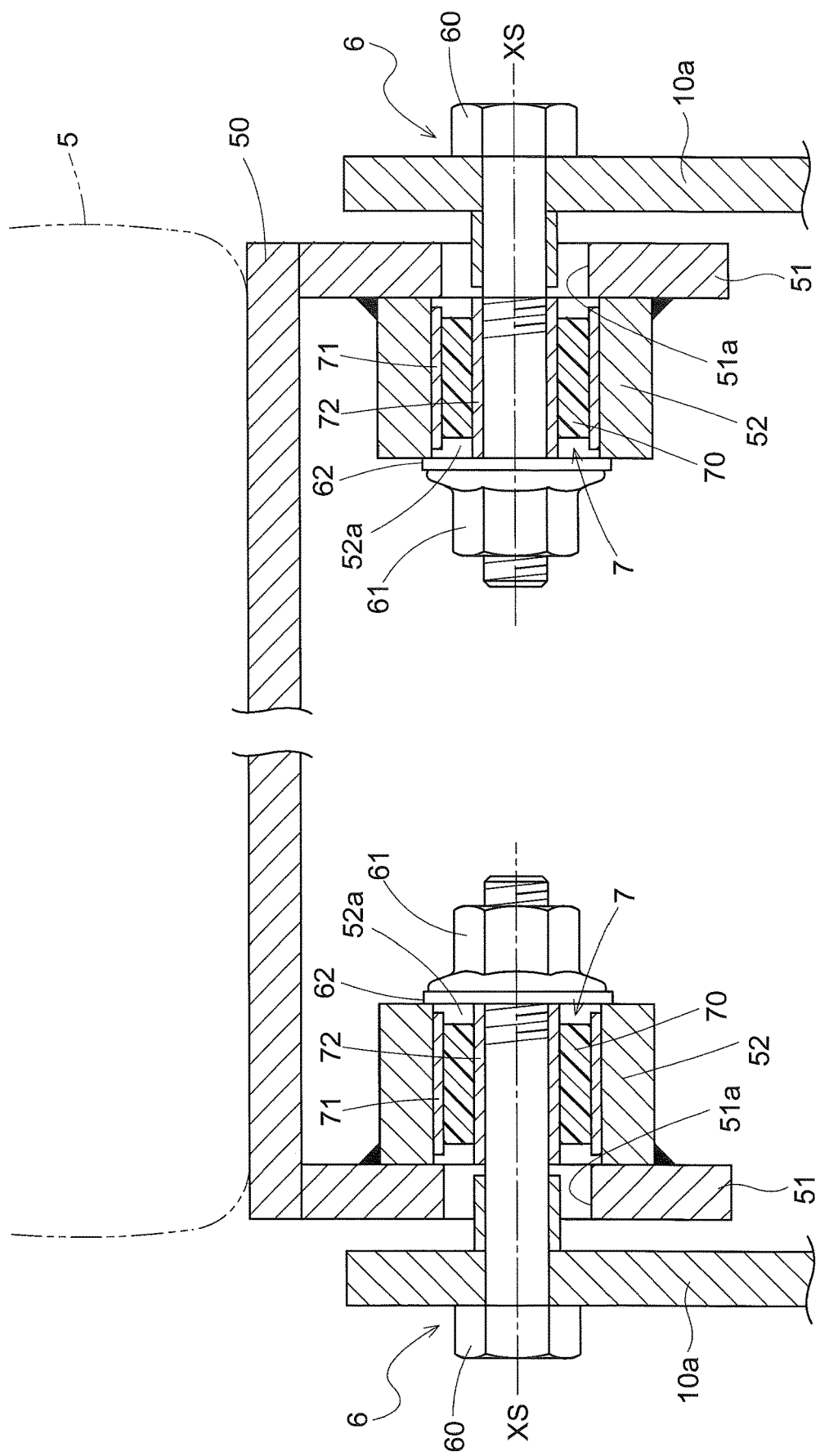
FIG. 4 is a section view in the vehicle body transverse direction showing an arrangement of a pair of left and right isolators disposed between the vehicle body frame and the seat base.

FIG. 3 and FIG. 4 show an attachment arrangement of the seat base 50 to the vehicle body frame 10. The seat base 50 includes, at a front end portion thereof, a pair of left and right plate-like arms 51. In each arm 51, there is provided a through hole 51a which extends in the vehicle body transverse direction. On the inner face of the arm 51, there is provided a cylindrical boss portion 52. A boss hole 52a of the boss portion 52 has a larger diameter than the through hole 51a. The boss hole 52a and the through hole 51a are coaxial, the common axis thereof being indicated by a sign XS.

Connection between the vehicle body frame 10 and the seat base 50 is effected by a bolt unit 6 which is inserted into the boss hole 52a and the through hole 51a. The bolt unit 6 includes a bolt body 60, a nut 61 and a washer 62. By fastening a front bracket 10a fixed to the vehicle body frame 10 and the boss portion 52 in the direction of the axis XS, the bolt unit 6 pivotally attaches the seat base 50 to the vehicle body frame 10. Here, the bolt unit 60 functions as a "support shaft" for pivotally attaching the seat base 50 to the vehicle body frame 10.

As shown in FIG. 4, an isolator 7 is mounted between the boss body 60 and the boss portion 52. The body of this isolator 7 comprises a rubber body 70 having a cylindrical shape and a metal outer sleeve 71 is fitted on its outer circumferential face and a metal inner sleeve 72 is fitted on its inner circumferential face. The outer sleeve 71 is engaged within the inner circumferential face of the boss portion 52, whereas the inner sleeve 72 is engaged on the outer circumferential face of the bolt body 60. Either one or both of the outer sleeve 71 and the inner sleeve 72 can be omitted. In such case, the rubber body 70 will directly contact the inner circumferential face of the boss portion 52 or the outer circumferential face of the bolt body 60.

As shown in FIG. 3, in the instant embodiment, between the lower face at the rear region of the seat base 50 and a rear bracket 10b fixed to the vehicle body frame 10, a suspension unit SU is disposed. Incidentally, this suspension unit SU can alternatively be disposed between the seat cushion 5a and the seat base 50. The suspension unit SU suppresses displacement of the seat base in the vehicle body vertical direction which is a pivotal displacement about the bolt body (support shaft) 50. The arrangement of the suspension unit SU is not particularly limited here. Such suspension unit SU, generally, as shown in U.S. Pat. No. 10,023,083 also, will be comprised of combination of a spring, a damper, a link mechanism, etc. Needless to say, instead of such suspension unit SU, it is also possible to employ a simple suspension unit SU comprising only mounting of an elastic member such as a rubber or a spring between the seat base 50 and the rear bracket 10*b*.

With the above-described attachment arrangement between/among the seat base 50, the isolator 7, the bolt unit 6 and the vehicle body frame 10, in operation, vibration in the vehicle body front/rear direction between the seat base 50 and the vehicle body frame 10 is transmitted via the isolator 7 and the bolt unit 6 (the bolt body 60: support shaft). Further, vibration in the vehicle body transverse direction between the seat base 50 and the vehicle body frame 10 is transmitted via the bolt unit 6 alone. In other words, displacement of the seat base 50 in the vehicle body front/rear direction is absorbed by the isolator 7, thus being hardly transmitted to the vehicle body frame 10. Displacement from the vehicle body frame 10 to the seat base 50 will similarly be absorbed by the isolator 7 also. Whereas, displacement of the seat base 50 in the vehicle body transverse direction is transmitted via the bolt unit 6 directly to the vehicle body frame 10, hardly absorbed by the isolator 7. Similarly, displacement from the vehicle body frame 10 to the seat base 50 is hardly absorbed by the isolator 7.

Figure 5:
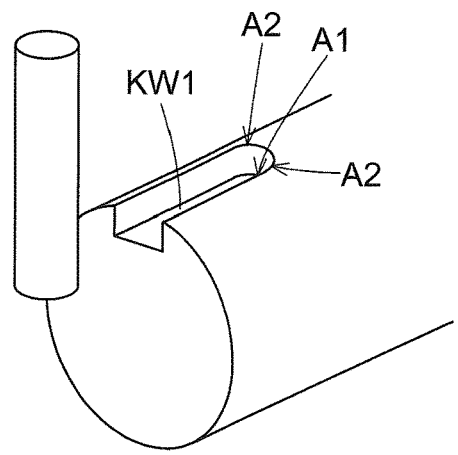
FIG. 5 is an explanatory view of a profiled type key groove worked by an end milling cutter.
Figure 6:
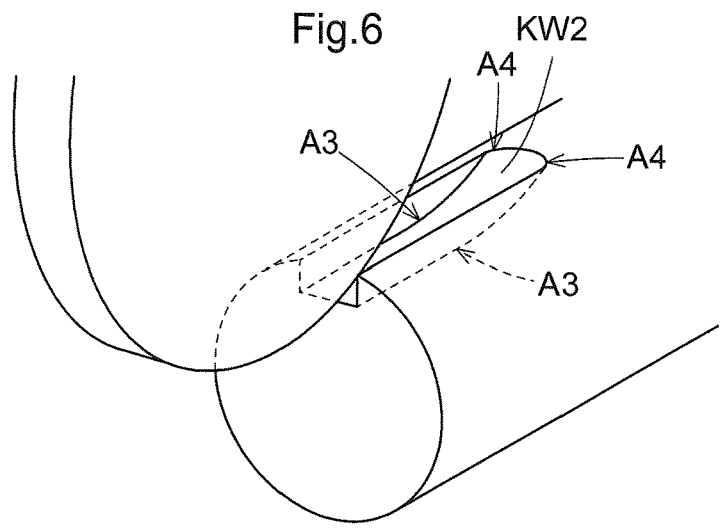
FIG. 6 is an explanatory view of a sled-runner type key groove worked by a side milling cutter.
Figure 7:
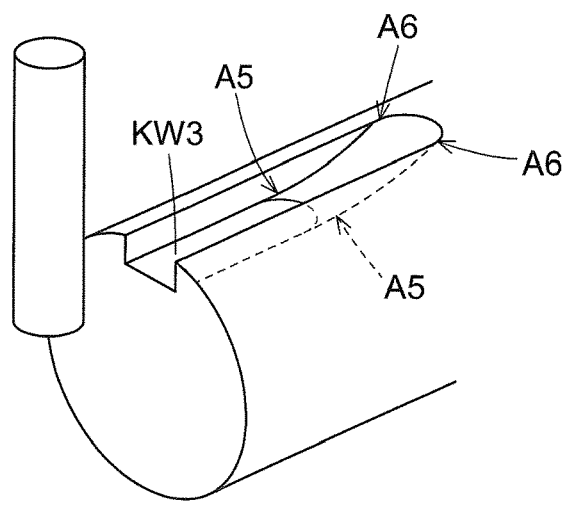
FIG. 7 is an explanatory view of an improved sled-runner type key groove KW3 worked by the end milling cutter.

Next, there will be explained a new technique relating to a key connection used in connection between a rotational shaft and a rotational member fixed to this rotational shaft. Conventionally, there have been employed a profiled type key groove KW1 worked by an end milling cutter as shown in FIG. 5 or a sled-runner type key groove KW2 worked by a side milling cutter as shown in FIG. 6. In the case of a work vehicle such as a mower, forward traveling and reverse traveling are effected frequently in repetition. In the course of these, a significant stress concentration occurs in the key groove. In order to reduce such stress concentration occurring in the key groove, an improved sled-runner type key groove KW3 as shown in FIG. 7 can be employed advantageously. This improved sled-runner type key groove KW3 is manufactured by controlling a milling feed and a filling depth using an end milling cutter. In this improved sled-runner type key groove KW3, in comparison with the sled-runner type key groove KW2, the depth of the terminal region of the key groove changes more gently. In the profiled type key groove KW1, there is no depth gradient at the terminal region (denoted with signs A1, A2 in FIG. 5) of the key groove. In the sled-runner type key groove KW2, at the terminal region (denoted with signs A3, A4 in FIG. 6) of the key groove, there is steeper gradient in depth than the improved sled-runner type key groove KW3.

Figure 8:
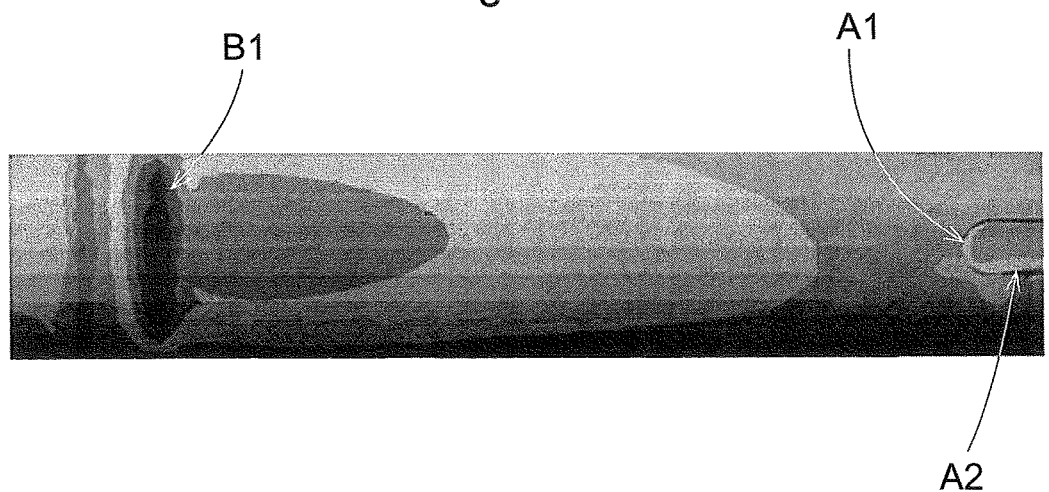
FIG. 8 is a graph showing result of analysis on stress concentration that occurs in the profiled type key groove.
Figure 9:
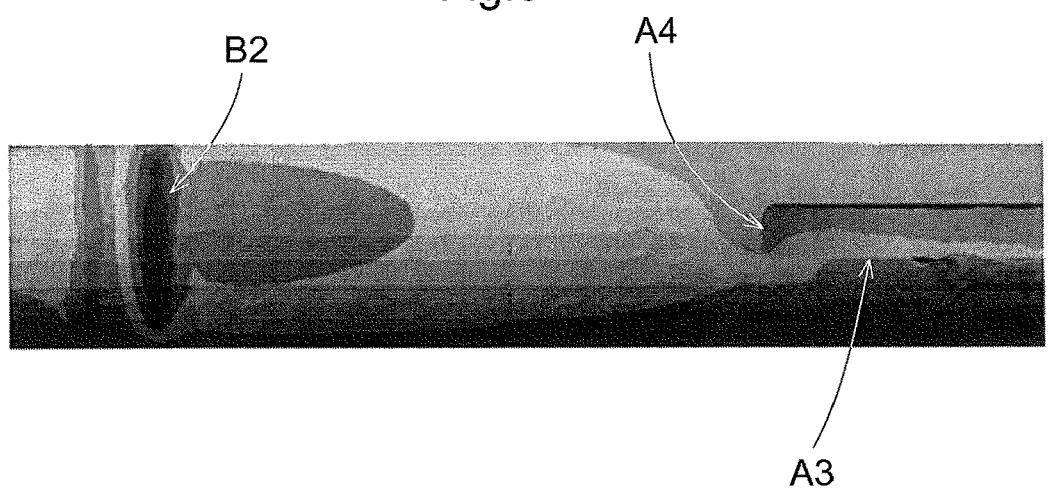
FIG. 9 is a graph showing result of analysis on stress concentration that occurs in the sled-runner type key groove.
Figure 10:
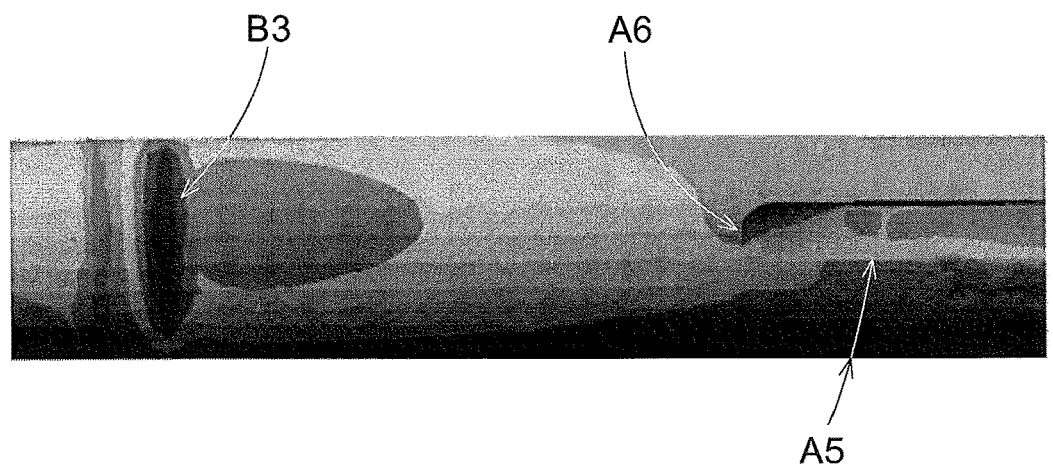
FIG. 10 is a graph showing result of analysis on stress concentration that occurs in the improved sled-runner type key groove

FIG. 10 shows an example respectively of results of analysis of stress concentrations occurring in the above-described three key grooves. FIG. 8 shows the analysis result of the profiled type key groove KW1, a sign B1 denoting the position of the starting end of the key groove, the signs A1, A2 denoting the terminal region of the key groove. FIG. 9 shows the analysis result of the sled-runner type key groove KW2, a sign B2 denoting the position of the starting end of the key groove, the signs A3, A4 denoting the terminal region of the key groove. FIG. 10 shows the analysis result of the improved sled-runner type key groove KW3, a sign B3 denoting the position of the starting end of the key groove, signs A5, A6 denoting the terminal region of the key groove. Based on these analysis results, it has been found that the stresses at the respective positions denoted by the signs B3, A5, A6 in the improved sled-runner type key groove are clearly smaller than the stresses at the respective positions denoted by the signs B2, A3, A4 of the sled-runner type key groove KW2 and the stresses at the respective positions denoted by the signs B1, A1, A2 of the profiled type key groove KW1.

In the foregoing embodiment, rubber was employed in the isolator. Instead, any other elastic body or material than rubber can be employed also.

In the foregoing embodiment, a mower, in particular, a zero-turn mower was used as a work vehicle. Needless to say, the inventive work vehicle can be any other riding type mower or even a tractor, a rice planting machine, a combine, etc., advantageously.

In the meantime, the arrangements disclosed in the foregoing embodiment (including the further embodiment) can be used in combination with arrangements disclosed in the other embodiments as long as such combination does not result in contradiction. Further, it is understood that the embodiments disclosed in this detailed disclosure are only illustrative, and the scope of the present invention is not limited thereto. In fact, various modifications can be made appropriately within a range not deviating from the essence of the invention.

The invention claimed is:

1. A work vehicle comprising:
   a vehicle body frame supported on a ground surface via wheels;
   a seat base;
   a driver's seat attached to the seat base;
   a support shaft attached to the seat base and extending in a vehicle body transverse direction, the support shaft pivotably connecting the seat base with the vehicle body frame; and
   an isolator mounted on the support shaft to absorb only vibration in a vehicle body front/rear direction.

2. The work vehicle of claim 1, wherein vibration in the vehicle body front/rear direction between the seat base and the vehicle body frame is transmitted via the isolator and the support shaft whereas vibration in the vehicle body transverse direction between the seat base and the vehicle body frame is transmitted via the support shaft only.

3. The work vehicle of claim 2, wherein:
   the support shaft is constituted of a bolt unit that can fasten the vehicle body frame and the seat base together in the vehicle body transverse direction; and
   the isolator comprises a cylindrical body whose inner circumferential face contacts the support shaft and whose outer circumferential face contacts the seat base.

4. The work vehicle of claim 3, wherein:
   the seat base includes a boss portion having a boss axis extending in the vehicle body transverse direction;
   the seat base and the support shaft are disposed such that an axis of the support shaft agrees with the boss axis; and
   the isolator is engaged within an inner circumferential face of the boss portion and engaged on an outer circumferential face of the support shaft.

* * * * *